US005896644A

United States Patent [19]

Lucenta et al.

[11] Patent Number: 5,896,644
[45] Date of Patent: Apr. 27, 1999

[54] WIRE END PREPARATION APPARATUS AND METHOD

[75] Inventors: Robert William Lucenta, Naperville; Thomas P. Pellegrino, Lisle; Eric Stenstrom, Warrenville; Steven F. Wright, Glen Ellyn; Hans G. Krause, St. Charles, all of Ill.

[73] Assignee: Molex Incorporated, Lisle, Ill.

[21] Appl. No.: 08/808,643

[22] Filed: Feb. 28, 1997

[51] Int. Cl.[6] ...................... B23P 23/00

[52] U.S. Cl. ...................... 29/566.1; 29/564.4; 29/566.3; 29/749; 29/867

[58] Field of Search ...................... 29/564.4, 867, 29/33 M, 748, 749, 566.1, 655.2, 566.3

[56] References Cited

U.S. PATENT DOCUMENTS

| | | | |
|---|---|---|---|
| 3,884,276 | 5/1975 | Poplaski | 140/115 |
| 4,167,202 | 9/1979 | Price | 140/115 |
| 4,183,383 | 1/1980 | Gudmestad et al. | 140/105 |
| 4,188,702 | 2/1980 | Herbert | 29/867 |
| 4,581,796 | 4/1986 | Fukuda et al. | 29/867 |
| 4,584,912 | 4/1986 | Gudmestad et al. | 29/33 M |
| 4,782,578 | 11/1988 | Wu | 29/564.4 |
| 4,802,512 | 2/1989 | Kodera | 29/564.4 |
| 5,179,775 | 1/1993 | Bogotzek et al. | 29/33 M |
| 5,628,108 | 5/1997 | Ingwersen et al. | 29/749 |
| 5,664,324 | 9/1997 | Hoffa et al. | 29/33 M |
| 5,689,874 | 11/1997 | College | 29/564.4 |

*Primary Examiner*—William Briggs
*Assistant Examiner*—Christopher Kirkman
*Attorney, Agent, or Firm*—Charles S. Cohen

[57] ABSTRACT

An apparatus for preparing the free ends of individual wires of a multi-conductor cable is disclosed. The apparatus includes a wire nest for separating the individual wires into distinct multiple wire sets and each wire of the wire sets includes multiple conductive strands. A wire stripper is provided in alignment with the wire nest to grip outer insulative coverings of the wires in each set and strip a preselected length of the covering therefrom. A wire twister is provided generally adjacent the wire stripper to engage and twist the multiple strands of each wire and a trimming knife cuts the exposed, twisted wires after they have been twisted.

24 Claims, 8 Drawing Sheets

WIRE END PREPARATION APPARATUS AND METHOD

BACKGROUND OF THE INVENTION

The present invention relates generally to wire preparation tooling, and more particularly to a machine for preparing the free ends of multi-stranded wire conductors for welding.

Multi-conductor, jacketed cables are used widely in the electronics industry to interconnect various electrical devices together. These multi-conductor cables contain a plurality of wires that may be terminated to connector contacts, connector bus bars, support blades or the like to form a connector. Often each conductor of these multi-conductor cables has an inner core comprised of multiple conductive strands surrounded by an outer insulative covering. In most instances in the assembly of these conductors, the wires are individually attached, such as by welding or soldering, to a corresponding plurality of electrically conductive contacts. Soldering of the wires is a tedious and time-consuming task and the soldering process itself lends itself to potential contamination of the connector contacts.

When the free ends of these multi-strand wires are attached to a set of contacts by resistance welding, the wire strands must be twisted together so that the free ends have enough body to resist the electropressure generated by such welding. This twisting has heretofore been accomplished by manual labor and, as such, it is a tedious labor-intensive and time-consuming task that increases the cost of wire preparation. This wire preparation and attachment process must often be repeated when the connector utilizes rows of contacts such as the LFH ("low insertion force helix") connectors made by Molex Incorporated of Lisle, Ill., the assignee of the present invention. Such a connector is described in U.S. Pat. No. 4,740,180, issued Apr. 26, 1988 to Molex. The number of wire attachments in such connectors may range from about 10 individual attachments to about 200 individual attachments.

The preparation of the free ends of the cable wires is currently performed by hand. This method is costly for it is labor intensive and it is prone to irregularities because the wires are twisted by hand and uniform twisting and stripping of the wires is therefore hard to obtain.

The present invention is directed to a wire preparation assembly that prepares a plurality of multi-strand wires for welding by stripping the wires, twisting the exposed wire strands and cutting the wires to an appropriate length for welding. In this preparation, the wire insulations are stripped to a specific length, the wire strands are twisted simultaneously for the same number of rotations and the wires are clearly cut to a uniform proper length.

SUMMARY OF THE INVENTION

The present invention, in one principal aspect, provides a wire preparation apparatus for a multi-conductor cable that simplifies the labor-intensive task of preparing individual wires of the cable for welding. In this regard, the preparation apparatus strips the wires in a single step to a uniform length, twists the wire strands together to minimize dispersion of the wire strands under welding pressure and trims the wires to a proper length for termination. All of the wires are twisted the same amount together at once, which renders the stranded wires more robust during welding termination and thereby increase the strength of the final welded joint.

In another principal aspect, the present invention provides as part of the wire preparation apparatus, a means for controlling scrap wire cut from the wires and discarding the scrap after the twisting and cutting of the wires is completed, the wire scrap control means including a wire retention member that holds the free ends of the cable wires in their predesignated spacing during stripping, twisting and cutting. This wire scrap control means is pivotable out of an initial position wherein it holds the wire free ends and a discard position where the wire scrap control means impinges against an ejection surface, in the form of a discharge rib that ejects the cut ends of the wires.

In still another principal aspect, the present invention includes a wire strand twisting mechanism that twist the strands of each individual wire in a row of multiple wires simultaneously. Upwards of fifty individual wires may be accommodated as a single wire set in the wire strand twisting mechanism. The individual wires are held between two twisting members, that are operatively linked together and adapted for lateral movement such that lateral movement of one of the twisting members in one direction imparts a lateral movement of the other of the twisting members in an opposite direction. The range of motion for the twisting mechanism is adjustable so that the wire strands are rotated in multiple revolutions.

Therefore, it is a general object of the present invention to provide a wire preparation assembly for automated preparation of free ends of individual wires of multiple wire cables.

Still another object of the present invention is to provide a machine for preparing the ends of individual wires of a multi-wire cable for welding, each individual wire having multiple wire strands enclosed within an insulative covering, the preparation including stripping the insulative covering from the wires and twisting the multiple wire strands together to define a more robust wire core that resists dispersion under welding pressures and trimming the wires to a preselected length for termination, such as by welding to a strip of contacts or bus bar, the machine including a wire nest for holding a plurality of wires in multiple sets in a separate wire preparation positions, the wire nest being moveable into and out of engagement with a wire tooling head, the wire tooling head including two wire strippers that engage, from opposite sides, the insulative coverings of one set of wires extending out of the wire nest, the wire tooling head further including two wire twisting members that engage one of the multiple wire sets in a manner to thereby apply rotational forces thereto to twist the wire strands together.

Yet another object of the present invention is to provide wire preparation tooling for preparing the free ends of a plurality of wires that make up a wire cable wherein each of the cable wires includes a conductive inner core formed from a plurality of multi-strand wires, the core being connected by an outer insulative cover extending the length of the wire, the machine including a wire nest for separating the cable wires into a member of distinct wire sets, each of the wires in the wire sets being displayed in a common plane, the machine including a slide assembly for sliding the wire nest into and out of a preparation station of the machine, the preparation station including a pair of opposing wire stripping members disposed on opposite sides of the wire set common plane, the wire stripping members being moveable into engagement with a particular wire set to apply a stripping force thereto, the preparation station further including a pair of wire twisting members disposed proximate to the wire stripping members, and on opposite sides of the wire set common plane, the wire twisting members apply a rotational force to the wire set when contacting the wire set to thereby twist the multiple strands of the conductive inner cores together and the preparation station further including a wire trimmer adjacent to the wire stripper members, the trimmer being operable into and out of contact with the wire set for severing the wires at a specific location spaced apart from the stripped ends thereof.

Still yet another object of the present invention is to provide as twisting members for the machine, two elongated twister members that are adapted for movement transverse to the common plane of the wire sets, the twister members being operatively linked together so that movement of one of the twister members in one direction impacts movement of the other twister member in an opposite direction, thereby applying a rotational force to the wires held between the twister members.

Still yet another object of the present invention is to provide a method for preparing the ends of wires of a bulk wire cable for termination to terminal assemblies, by separating the cable wires into distinct wire preparation sets, advancing the sets in serial order to a preparation station, stripping the outer insulative coverings from the wire sets, then twisting the exposed inner cores of the wires and then cutting the exposed inner cores to produce a plurality of prepared wire ends in each wire set for subsequent termination to terminal assemblies.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which.

DETAILED DESCRIPTION OF THE PREFERRED EMBODIMENTS

Figure 1:
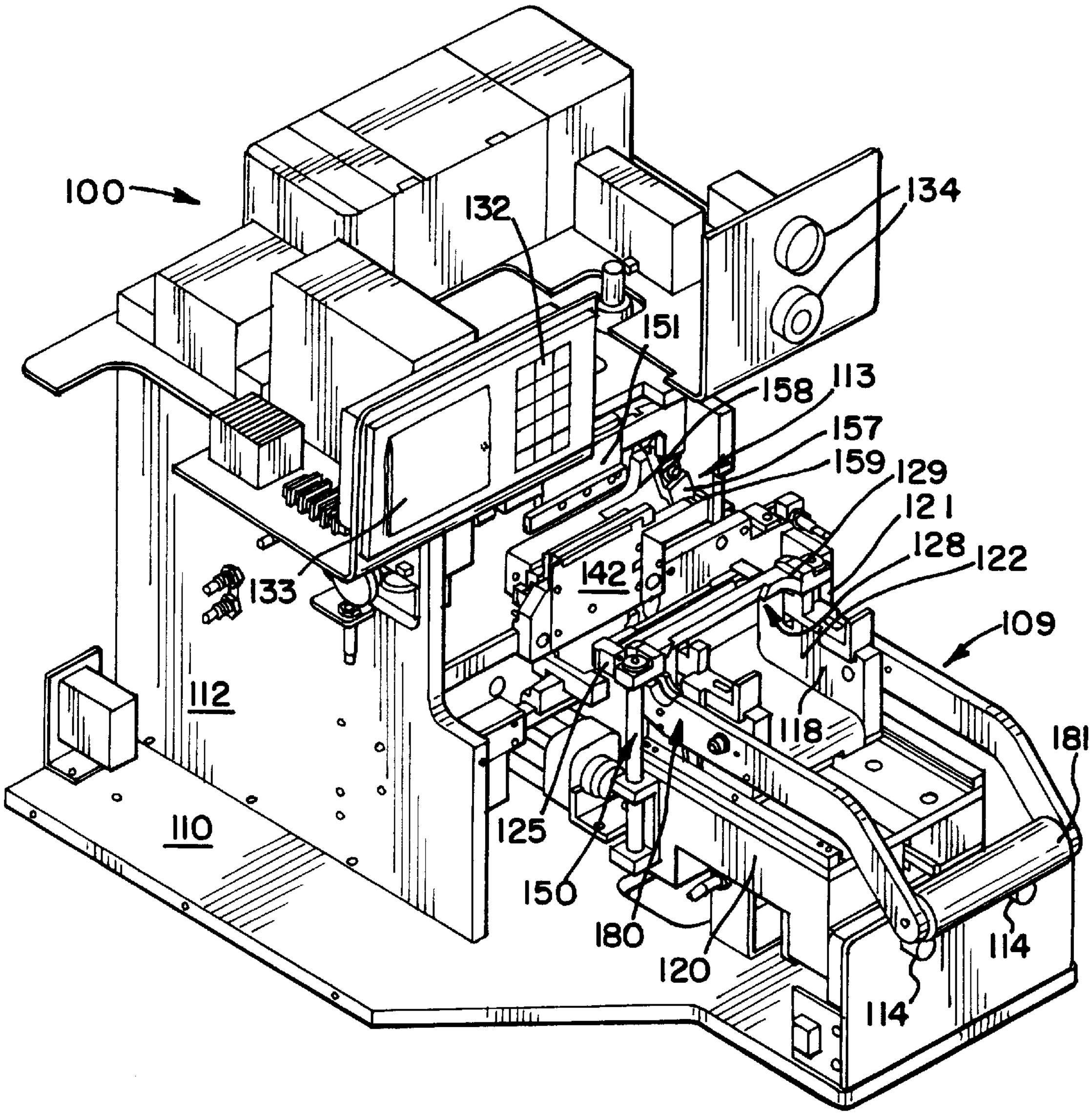
FIG. 1 is a perspective view of a wire preparation apparatus constructed in accordance with the principles of the present invention.

Turning initially to FIGS. 6–9, it should be noted that the present invention finds a great degree of utility in the field of wire preparation of multi-conductor cables 50 for termination to a connector 54. Such cables 50 contain a plurality of individual conductors 51 in the form of wires 52 that are terminated at their free ends to terminals of a connector 54. The connector 54 includes a housing 55 that encloses a plurality of electrically conductive terminals 56, with each terminal 56 having a wire 52 of the cable 50 terminated thereto. The wires 52 include conductive inner cores 58 comprised of a plurality of individual wire strands 59 that are surrounded by an outer insulative covering 60. The cable wires 52 may vary in number according to the number of circuits that the cable 50 must accommodate. Typically, the wires may range from between about ten wires per cable to about two hundred wires per cable.

In the termination of the wires 52 to the terminals 56 with the connector 54, the cable outer covering 62 is stripped from the end of the cable 50 and any intermediate shielding 63 may be folded back upon the cable covering 62, thereby exposing, for preparation, the free ends 53 of the wires 52 (FIG. 3) held within the cable 50. A length of the insulation 60 of each wire 52 is then stripped to expose the inner strands 59 of the wire 52. These wire strands 59 are then attached to the terminals 56 of the connector 54, usually by attaching them to a means such as the contact strip 64 illustrated in FIG. 7. The contact strip 64 may have a series of individual, isolated contacts 66 as well as a series of contacts that are interconnected by a conductive bus bar 67. The exposed wire strands 59 are then typically attached by a suitable process, such as by soldering or welding, in order to form a terminal assembly 68.

Figure 8:
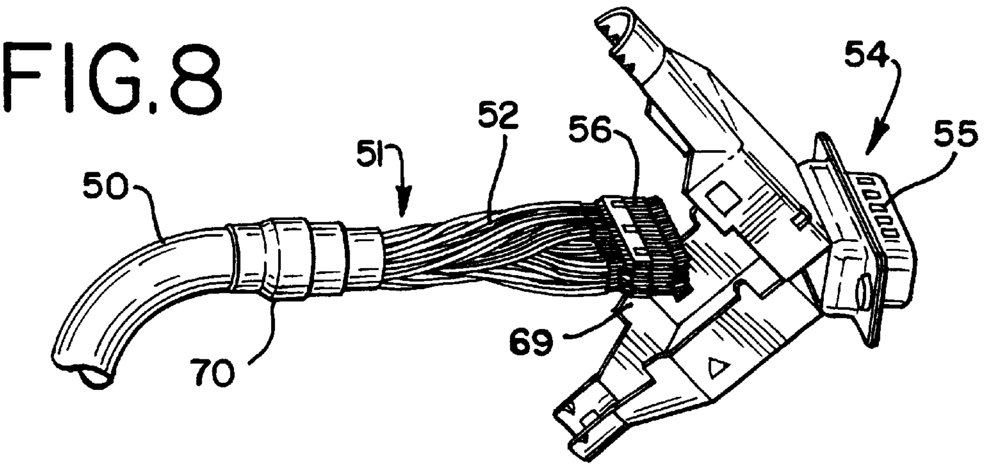
FIG. 8 is an exploded perspective view of a connector cable assembly of the type in which the cable wire free ends are prepared using the wire preparation apparatus of FIG. 1.
Figure 9:
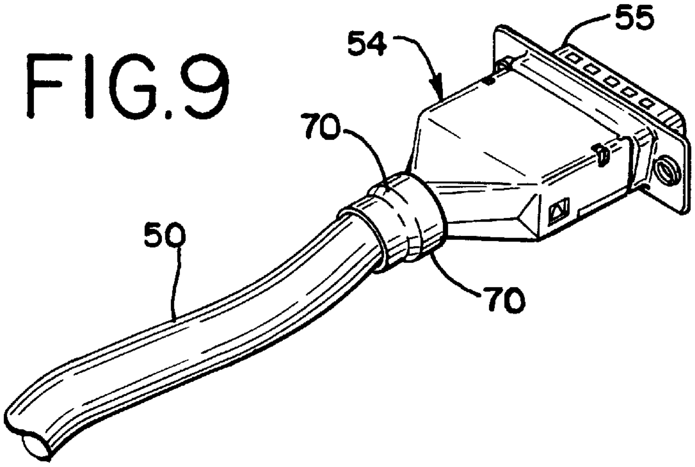
FIG. 9 is a perspective view of one completed end of the connector cable assembly of FIG. 8.
Figure 10:
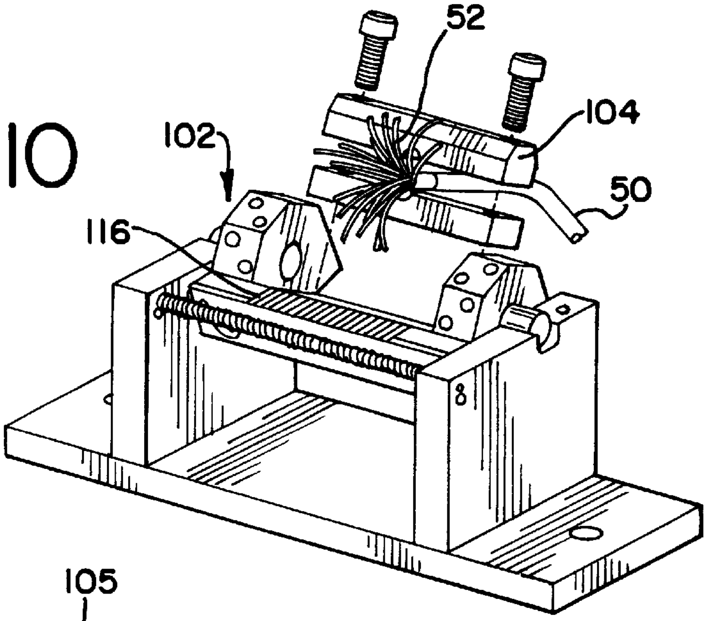
FIG. 10 is a perspective view of a wire nest and a cable wire clamp used for separating and displaying cable wires for preparation by the wire preparation apparatus of FIG. 1.

Once the terminal assemblies 68 are formed, they may be stacked together as illustrated in FIG. 8 and inserted into the connector housing 55. A shell 69 formed from two interconnecting members may be applied to the cable 50 and the connector 54 and held in place thereon by a ferrule 70. Problems may arise in the attachment of the exposed wire strands 59 to the terminal contact strip 64. Soldering sometimes causes contamination of the terminal assemblies 68 and in resistance welding, the electropressure developed during welding can cause the wire strands 59 to disperse from their original position. This dispersion can weaken the welded joint that occurs between the wire strands 59 and the terminals 56, but it also may lead to shorting where one or more strands may disperse to the point where they make contact with an adjacent terminal. In order to avoid this problem, the exposed wire strands 59 of individual wires 52 are twisted together to form a stronger conductive core 58 of the wires 52.

Presently, the preparation of wire ends in the manner described above is done manually, with laborers performing the stripping, twisting and cutting by hand. This process is time-consuming and expensive in areas where labor costs are high. Additionally, by stripping and twisting the wires by hand, there is no assurance of uniformity in the preparation process. The present invention is therefore directed to an apparatus, shown generally at 100 in FIGS. 1–4, that automates much of the wire preparation process by performing the stripping, twisting and cutting steps automatically. The present invention applies a desirable measure of uniformity to the process steps and produces more reliable and robust weld joints between the cable wires 52 and the terminal contact strip 64.

The Cable Wire Display Nest

Figure 11:
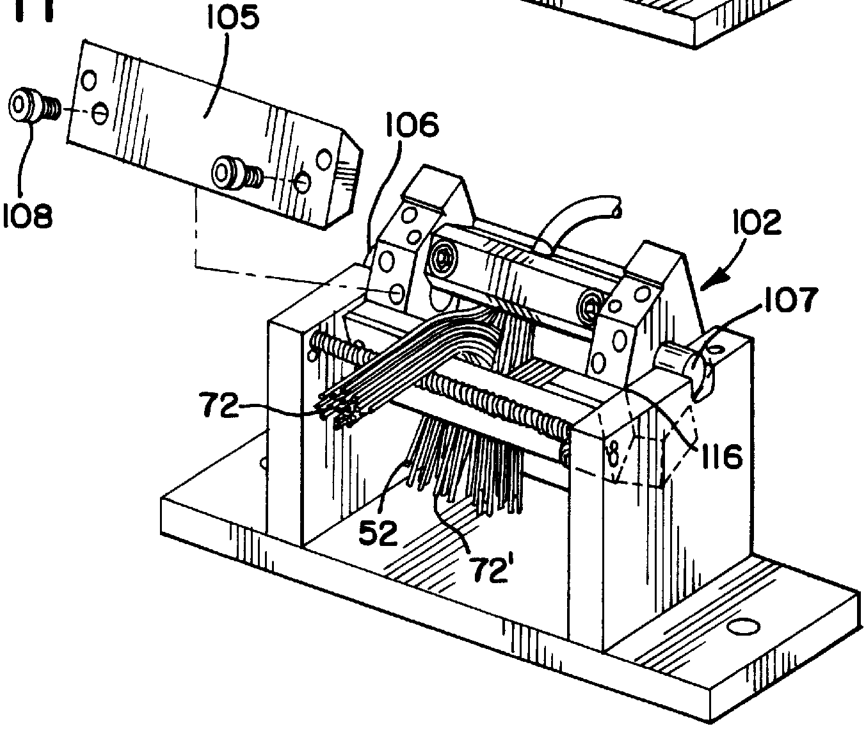
FIG. 11 is a perspective view of the wire nest of FIG. 10 illustrating the manner in which the wire clamp blocks are assembled.

A wire nest 102 (FIG. 3) is used in conjunction with the apparatus 100 (FIG. 1) in order to display the free ends 53 of the cable wires 52 in distinct, multiple wire sets 72 and maintain the wires 52 in each set 72 at a predetermined spacing that corresponds to the spacing of the contacts on the contact strip 64. This spacing significantly reduces the amount of alignment correction by an assembler during the welding of the inner conductive cores 58 to contact strips 64. The wire nest 102 (FIG. 11) includes a cable clamp 104 that holds the cable 50 in place within the interior of the wire nest 102. The free ends 53 of the cable wires 52 are segregated into distinct sets 72 of a preselected number of wires 52, with each set 72 being held between pairs of adjacent wire clamp blocks 105. One of each of the pairs of wire clamp blocks 105 (or both) may include a plurality of wire-receiving slots 116 for maintaining the wires in their chosen spacing. The wire clamp blocks 105 are held in place on the wire nest 102 by way of screws 103 or other suitable means.

The wire nest 102 has two shafts 106, 107 extending from opposite sides thereof, one of the shafts 106 being cylindrical and the other of the shafts 107 being hexagonal. The hexagonal shaft 107 is useful in locating each set 72 of wires 52 and orienting the set 72 for preparation by the apparatus 100. The wire nest 102 is mounted in a slide assembly 109 that slidably engages one or more rails 114 so that the slide assembly 109 may move the wire nest 102 (and its wire sets 72) in a horizontal path along a longitudinal axis of the apparatus 100 in and out of engagement with the wire preparation opening 113 of the apparatus 100.

Figure 2:
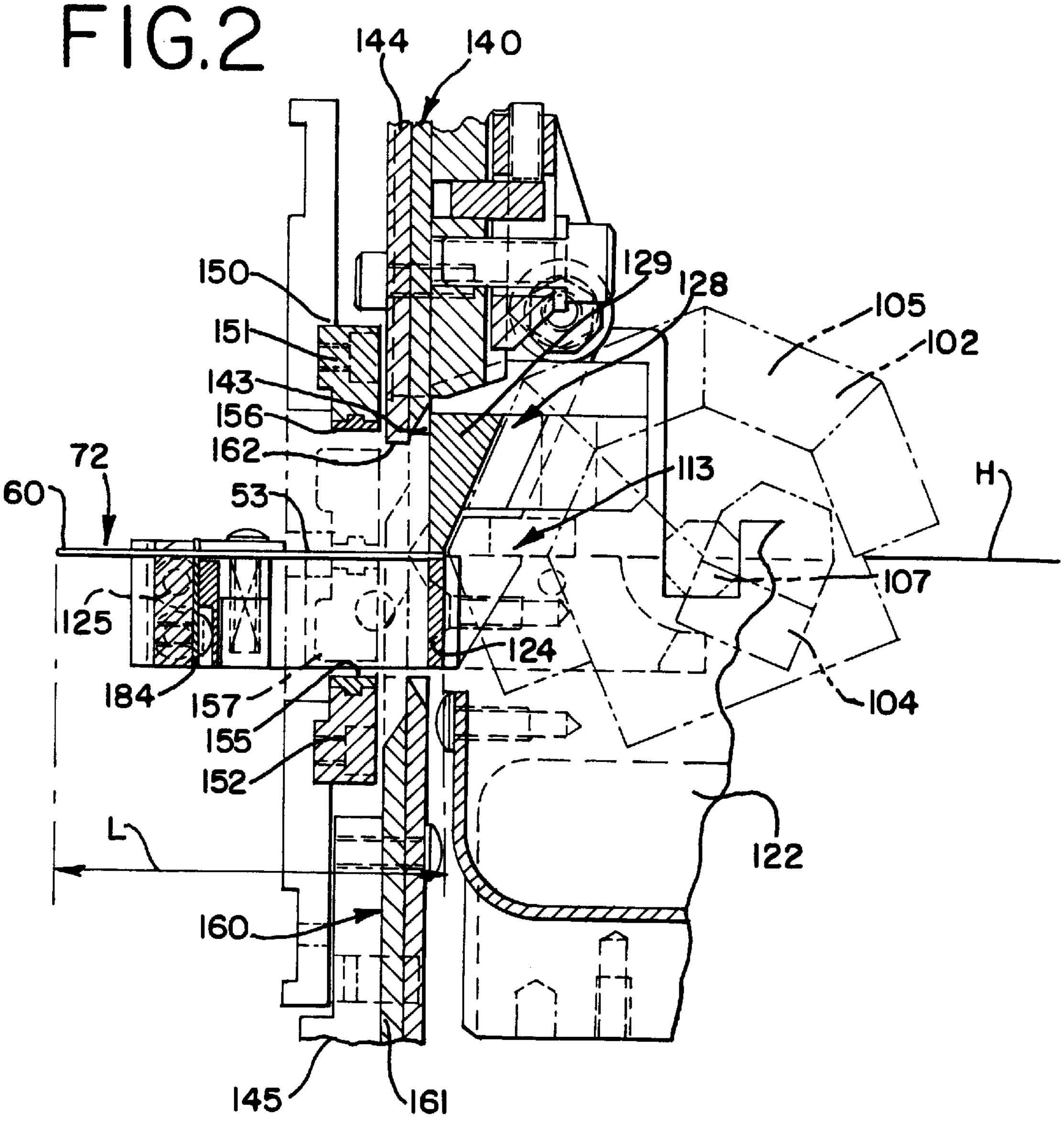
FIG. 2 is an elevational view, partly in section, of the wire preparation apparatus of FIG. 1 illustrating the tool in an open, ready position with the slide assembly thereof advanced into the wire preparation opening of the apparatus showing that one set of cable wires are in place therein for preparation.
Figures 3, 4:
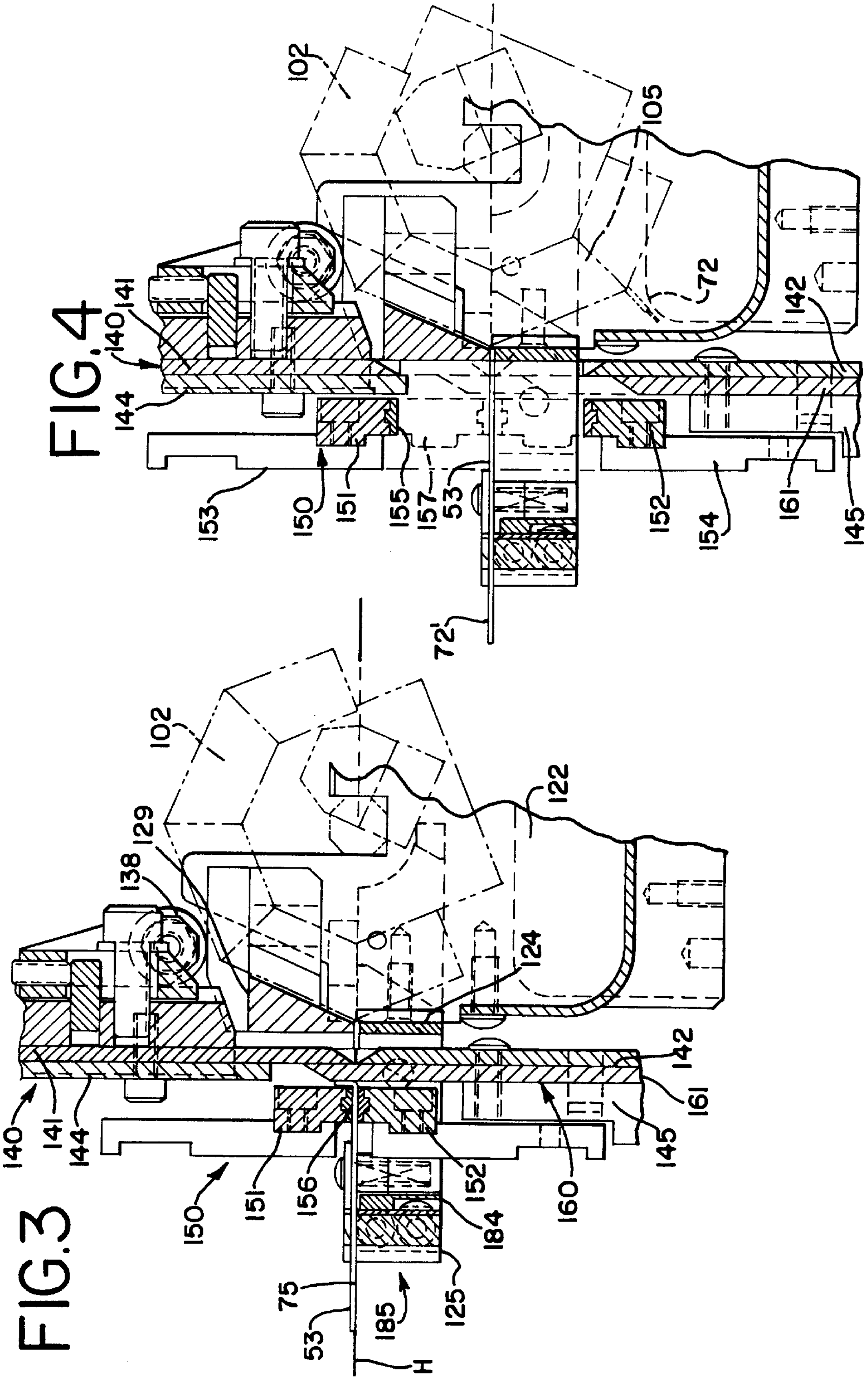
FIG. 3 is an elevational view, partly in section, similar to FIG. 2, but illustrating the wire preparation apparatus after it has prepared one set of cable wire free ends by stripping, twisting and cutting the cable wire free ends.
FIG. 4 is the same view as FIG. 2, but illustrating the cable wire nest rotated one increment to expose a new set of cable wire free ends for preparation by the wire preparation apparatus.
Figure 12:
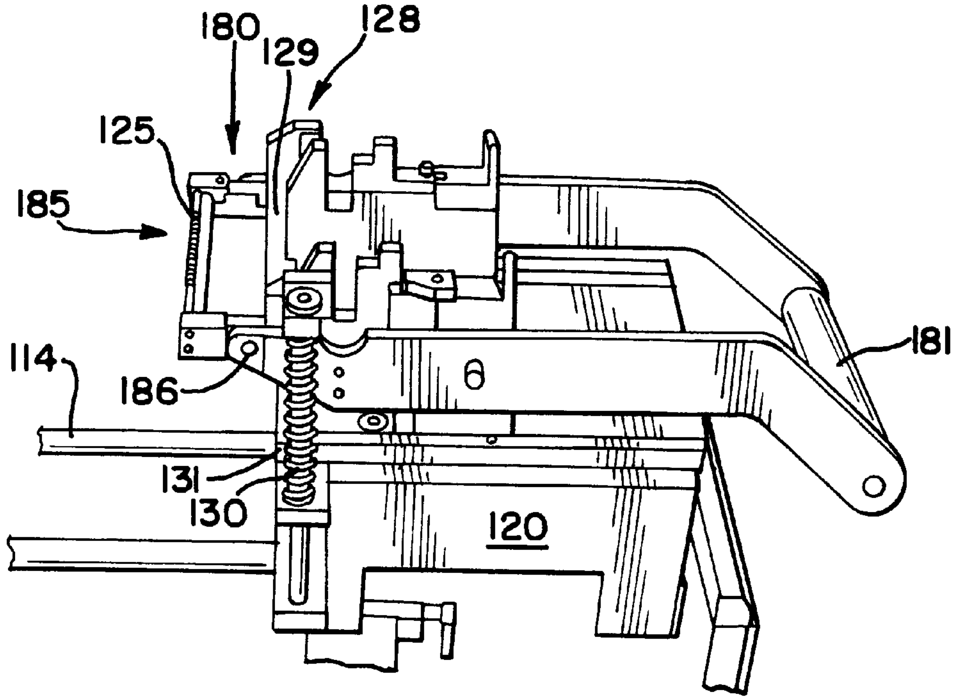
FIG. 12 is a perspective view of the slide assembly of the wire preparation apparatus of FIG. 1, showing the wire support arm in a wire preparation position.
Figure 13:
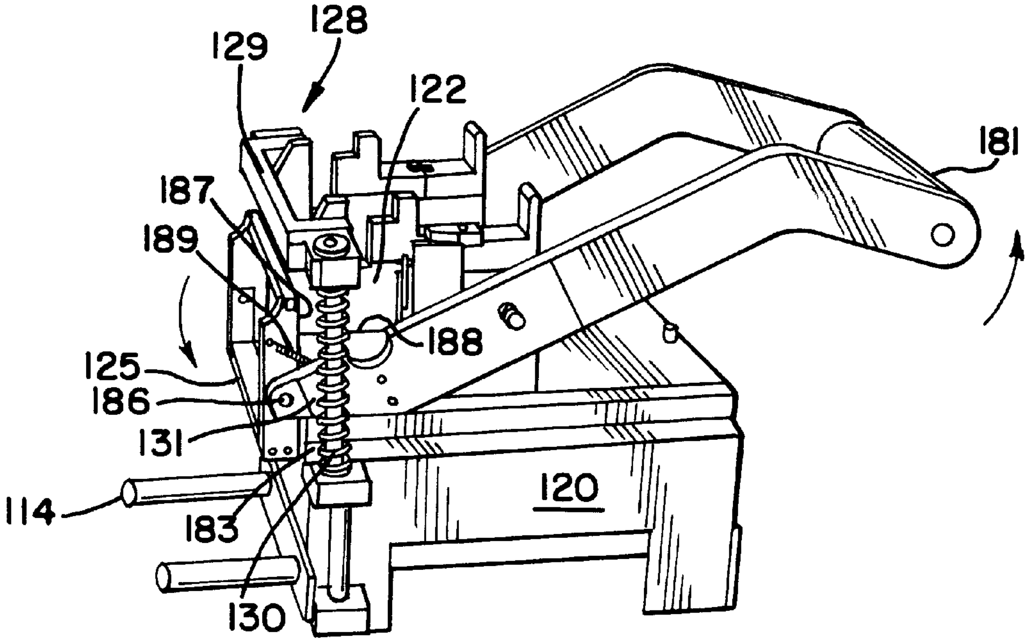
FIG. 13 is the same view as FIG. 12, but illustrating the wire support arm of the slide assembly in a scrap wire ejection position; and, FIG. 14 is a perspective view of the wire preparation apparatus illustrating the wire preparation opening of the apparatus and the components of the apparatus.
Figure 14:
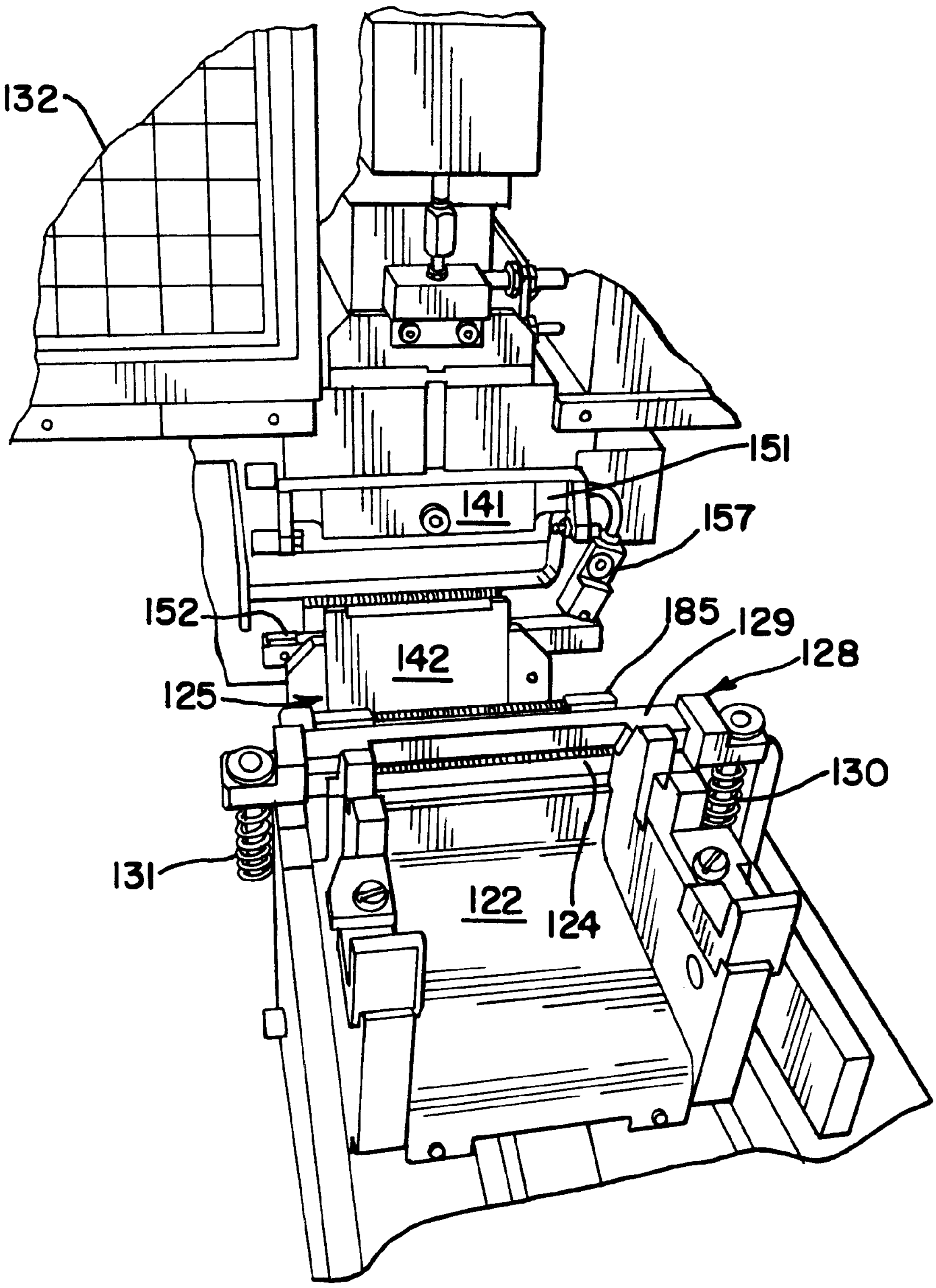

The slide assembly 109 includes a pair of supports 118 that extend up from a base portion 120 and together with the base 120 cooperatively define a cradle area 122 that receives and supports the wire nest 102. In this regard, the supports 118 include a pair of recesses 121 that receive the shafts 106, 107 of the wire nest 102 in a manner so that the free ends of the cable wires 52 of each wire set 72 are supported in a common, and preferably horizontal, plane. As illustrated in FIGS. 12 & 13, the slide assembly 109 also preferably includes a wire clamping mechanism 128 that includes a transverse wire clamp 129 supported on two posts 130. The wire clamp 129 serves to retain the wires 52 in place in their horizontal position H and therefore abuts the primary wire comb 124. The wire clamp is biased into an open position (FIGS. 12 & 13) by a pair of springs 131 associated with and surrounding the posts 130. When the slide assembly 109 is driven into the wire preparation opening 113 of the apparatus, as shown in FIGS. 2–4, the wire clamp 129 is driven down into a locking position where it abuts the primary wire comb 124. This driving action is effected by one or more cams 138 mounted near the wire preparation opening 113 of the apparatus 100. The cam 138 holds the wire clamp 129 in a closed position during wire preparation, especially during wire stripping to ensure that the wire stripping occurs along the face of the wire stripper members 141, 142.

In order to maintain the wire free ends in this common plane and in their appropriate terminal assembly attachment spacing, the slide assembly may be equipped with one or more wire combs 124, 125, as illustrated best in FIGS. 2–4. One of these combs 124 serves as a primary wire comb while the other comb 125 serves as a secondary wire comb. These two wire combs 124, 125 also support the preparation length L of the free ends of the wires 52 as they are supported by the wire nest 102. This preparation length is preferably long enough to permit complete preparation of the wire free ends 53. In practice, a distance of about 2 inches has produced desirable results.

The Wire Preparation Tooling of the Apparatus

Turning now specifically to FIG. 1, the wire preparation apparatus 100 includes a support base 110 and a pair of brackets 112 rising upwardly therefrom to define a wire preparation opening 113 in the apparatus 100 having the form of a nest into which the distinct sets 72 of cable wires 52, and particularly the free ends 53 thereof are brought by the slide assembly 109. The apparatus 100 preferably includes an internal memory and a programmable controller. A keypad 132 may be provided in order to permit the operator arrange the operational sequences of the apparatus 100. A display screen 133 may be supported on a face panel of the apparatus 100 alongside of the keypad 132 to display the sequences to an apparatus operator. one or more actuating switches 134 may be mounted on another portion of the face of the apparatus 100.

The apparatus 100 includes a plurality of wire preparation mechanisms that independently prepare the wires 52. These mechanisms include a wire stripping mechanism 140, a wire twisting mechanism 150 and a wire cutting mechanism 160. All three of these mechanisms 140, 150 & 160 are disposed in the wire preparation opening 113 of the apparatus 100 and are selectively operable in order to contact the cable wire free ends at different sequences according to a program held in a memory of the apparatus 100.

As seen best in FIGS. 2–5, the wire stripping mechanism 140 includes two opposing wire stripping blades 141, 142 that are located adjacent the primary wire comb 124 of the apparatus 100. These two wire stripping blades 141, 142 include serrated edges 143 (FIG. 5A) that are brought into contact with the outer insulation 60 of the cable wire set 72 disposed in the wire preparation opening 113 of the apparatus 100. The wire stripping blades 141, 142 are maintained within individual housings 144, 145, with the bottom wire stripper blade housing 145 being illustrated in FIG. 5A and both housings 144, 145 being illustrated in FIG. 5. The housings are supported on pistons, pneumatic, hydraulic or otherwise powered in coordinated, reciprocal vertical movement into and out of contact with the wire free ends 53. In operation, the stripping blades 141, 142 are brought into contact with the free ends 53 of the wire set 72 held in place by the wire nest 102.

As illustrated in FIGS. 2–4, this placement of the wire set 72 is maintained by the wire nest 102 in a common horizontal plane H. The wire stripping blades 141, 142 are positioned in a vertical plane in order to intersect the wires 52 along a line transverse to the horizontal wire plane H (as well as to the longitudinal axes of the wires 52 of the wire set 72) when the stripping blades 141, 142 are brought into contact with the wire 52. A uniform stripping of the wire insulation 60 therefore occurs when the slide assembly 109 is moved slightly rearwardly out of the wire preparation opening 113. This rearward movement defines the length of the exposed inner wire strands 59 of the wire set 72. A suitable stripping length for exposing the inner stranded cores of the wires 52 is about 2.5 mm.

In order to give the inner cores 58 of the wire free ends 53 more body to resist electropressure generated during welding, the wire preparation apparatus 100 includes a means to twist the wires 52 in a manner that will twist the inner wire strands 59. The wire twisting mechanism 150, as best shown in FIGS. 2–5, includes a pair of wire twister members 151, 152 that are disposed adjacent the wire stripping blades 141, 142, but upstream thereof along the axes of the wire free ends 53. The top and bottom wire twister members 151, 152 are held within respective holders 153, 154 and have elongated, flat wire contact surface 155 that extend transversely to the axes of the wire free ends 53.

The twister holders 153, 154 are operatively connected to power pistons that serve to move the holders 153, 154 in vertical movement into and out of contact with the wire free ends 53. As seen in FIG. 3, this contact occurs with the outer insulation 60 of the wires 52 alongside of the wire stripping mechanism 140. As explained below, the wire stripper members 141, 142 are brought into contact with the wires 52 during twisting in order to hold one portion of the wires 52 steady so that the wire free ends 53 twist, rather than rotate.

Figure 2A:
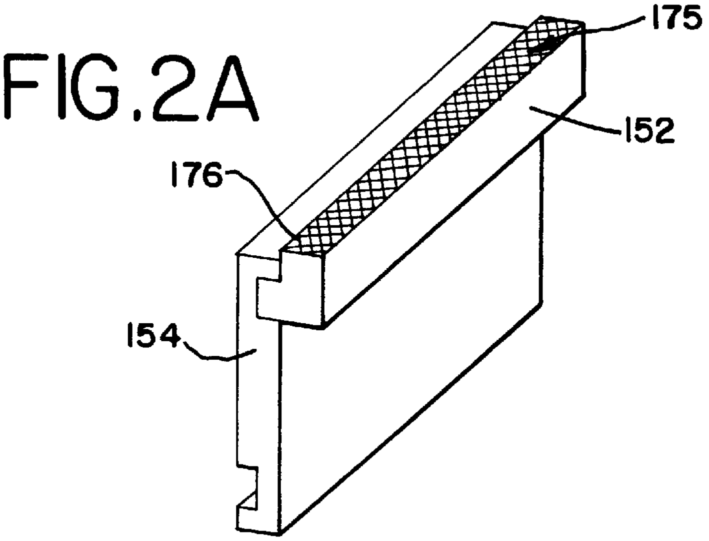
FIG. 2A is a perspective view of a twister member used in the twisting mechanism of the wire preparation apparatus of FIG. 1.
Figure 5:
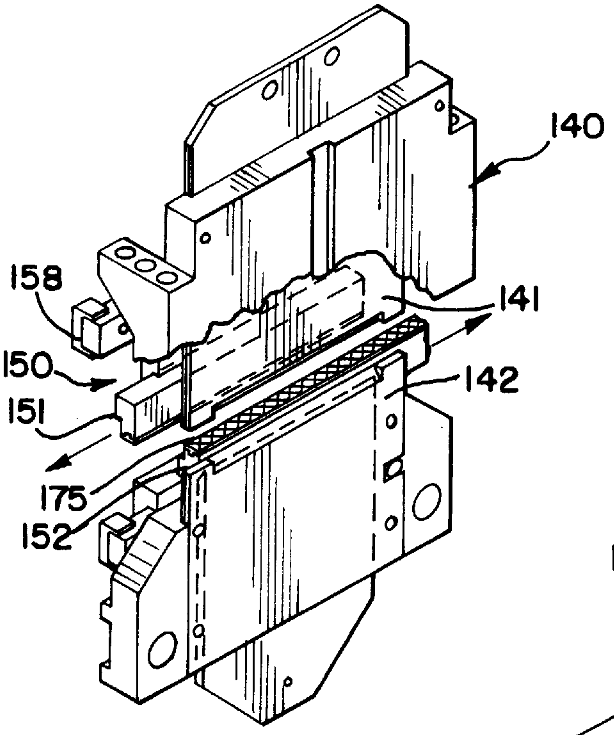
FIG. 5 is a partially exploded perspective view of the wire preparation mechanisms disposed in the wire preparation opening of the wire preparation assembly of FIG. 1.
Figure 5A:
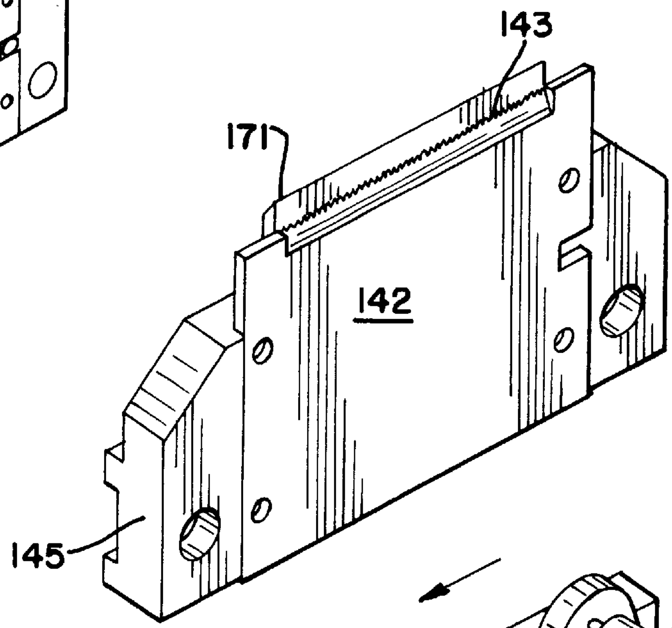
FIG. 5A ia an enlarged perspective view of the lower stripper member and housing therefor.
Figure 5B:
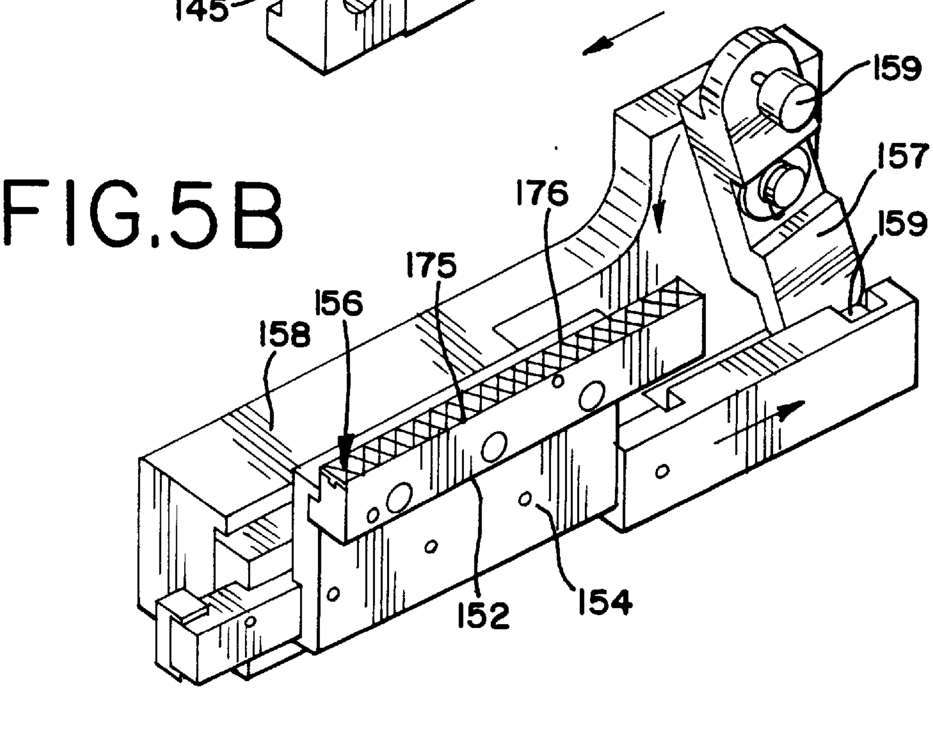
FIG. 5B is an enlarged perspective view of a portion of the wire twisting mechanism of FIG. 5, illustrating in greater detail the lower wire twister member and its components.
Figure 6:
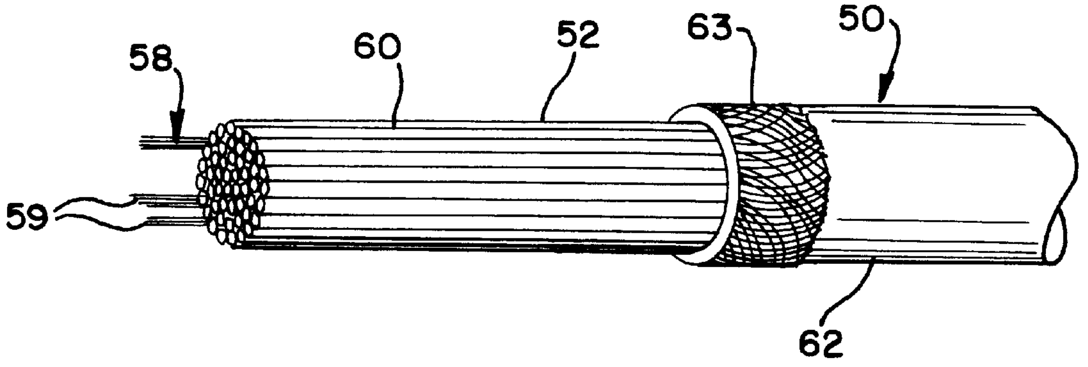
FIG. 6 is a perspective view of a multi-conductor cable wire, the wires of which are prepared by the wire preparation apparatus of FIG. 1.
Figure 7:
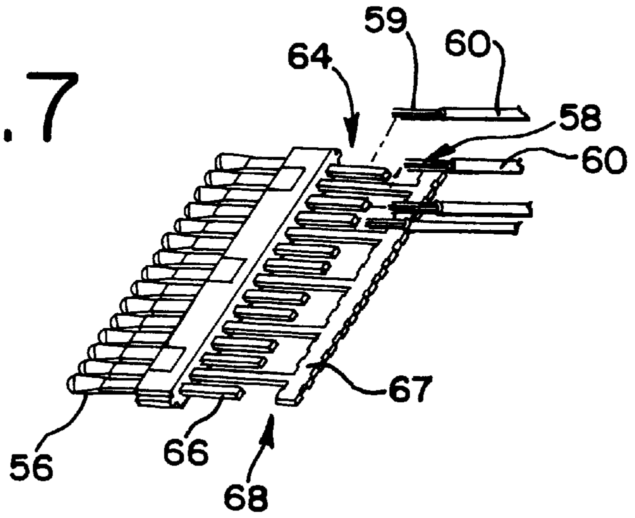
FIG. 7 is a perspective view of a terminal assembly, including a bussed contact strip, and some cable wire free ends, illustrating the attaching of the wire free ends to the bussed contact strip.

The wire twister members 151, 152 include contact surfaces 155, which as illustrated in FIGS. 2–4, may include an insert 156 of moderately flexible material, such as a material having a durometer of about 80. Alternatively, as illustrated in FIGS. 2A & 5, the twister members 151, 152 may include a roughened surface 175 formed by scribing, or otherwise forming a plurality of serrations 176 into the twister member 152. Importantly, the two wire twister members 151, 152 are operatively interconnected, such as by a linkage that includes a drive link 157 mounted for rotation on a twister support slide 158.

The ends of the link 157 are also connected to the twister members 151, 152 in a pivotal manner, such as by pins 159. In operation, one of the two twister members 151, 152 is moved laterally in one direction within the wire preparation opening 113 and the drive link 157 imparts a lateral movement to the other of the two twister members in the opposite direction. Thus, the wire free ends 53 are twisted simultaneously by both twister members 151, 152 the range of lateral motion of the two twister member 151, 152 is adjustable. It has been determined that when 28 AWG gauge wire is used for the cable wires 52, a lateral movement of about 100 mils (0.10 inches) will impart one complete revolution to the wire strands 59. Therefore, increasing the lateral movement distance to about 350 mils (about 0.35 inches) will impart about 3½ complete revolutions to the wire strands 59.

In order to trim the wires free ends 53, and particularly the exposed wire strands 59 thereof, a wire cutting mechanism 160 is provided and is disposed between the wire stripping mechanism 140 and the wire twisting mechanism 150. This cutting mechanism 160 includes a cutting knife 161 that is positioned beneath the wire set 72. The cutting knife 161 is positioned near the lower stripper member 142 and has a length that extends in a direction transverse to the axes of the wires 52 and this length is equal to the length of the serrated edge 143 of the lower stripper member 142. The cutting knife 161 is separately actuatable to move vertically into and out of the wire preparation opening to contact the wire free ends 53 held by the slide assembly 109 in the wire preparation opening 113. In cutting of the wires 52, the cutting knife 161 is forced upwardly against an opposing, planar cutting surface 162 that is disposed on a portion of the upper wire stripper member housing 145.

Lastly, after cutting the free wire ends 53, scrap wire portions 75 remain in place in the horizontal plane H and held by the secondary wire comb 125. The secondary wire comb 125 forms part of a wire scrap discharge mechanism 180 that is controlled by an operating lever 181 which manipulates the comb 125 between a horizontal wire preparation position (illustrated in FIG. 12) and a vertical scrap wire ejection position (illustrated in FIG. 13). The secondary wire comb 125 forms part of a wire support arm 185 that is pivotally connected by pins 186 to the operating lever 181. The wire support arm 185 includes a pair of cam followers 187 that follow contoured cam surfaces 188 on the slide assembly 109 that assist in forcing the wire support arm 185 and secondary wire comb 125 down into a scrap wire ejection position. One or more return springs 189 may be provided to assist the support arm 185 in returning to its normal, horizontal preparation position of FIGS. 2 & 12. A scrap wire discharge block or ejector 184 is positioned within the support arm 185 adjacent the wire comb 125. This ejector impinges against a discharge rib 183 formed on the front of the slide assembly base 120. This contact causes the ejector 184 to impinge against the scrap wires 75 and eject them from the wire comb 125 in order to ready the slide assembly 109 for positioning of another wire set 72'.

The Operation of the Wire Preparation Apparatus

In operation, the wire nest 102 is located with a cable 50 by locking the free end of the cable 50 into the cable clamp 104. The cable wire 52 are separated into distinct wire sets 72 and separated in their display positions between adjoining wire clamp blocks 105. When filled with the cable wires 52, the wire nest 102 is then loaded and locked into the slide assembly 109 and the apparatus 100 is energized. The slide assembly 109 travels along its rails 114 into the wire preparation opening 113 of the apparatus 100.

The lower tooling, i.e. the lower stripping blade 142 and the lower twister member 152 are brought up into the wire preparation opening 113 and into contact with the free ends 53 of the wire set 72. The upper wire stripping blade 141 is then brought down into the preparation opening 113 into contact with the wire set 72 as well as the upper twister member 151. Stripping of the wire free ends 53 then takes place when the slide assembly moves rearwardly on its rails for a preselected distance, about 2.5 mm. This stripping action will expose a similar length of the inner wire strands 59.

During this movement the twister members are in effect clamping the wires 52 together. The upper wire stripping blade 141 is then disengaged and the twister members 151, 152 are actuated to twist the wires 52 and the inner wire strands 59. As mentioned above, the two twister members 151, 152 are interconnected by a linkage 157 that moves then in opposite lateral directions for a preselected distance impart to the wire strands 59 a preselected amount of twist. This twisting of the wire strands 59 makes the exposed inner cores 58 of the wire free ends 53 move robust so that they are less likely to disperse under the pressure from welding and also results in a more effective and stronger welded joint between the wires 52 and the terminal assembly 68.

Once the wires 52 have been twisted, the upper stripper member 141 is brought down into contact with the exposed wire strands 59 present in the wire preparation opening 113 and the wire cutting knife 161 is brought up into contact with the exposed wire strands (FIG. 3) and against the cutting surface 162 of the upper stripper member 141. This cutting occurs along a uniform line. The cutting knife 161 is then retracted and the wire twister members 151, 152 are then reset to their original position.

The slide assembly 109 is then moved out of the wire preparation opening 113 of the apparatus 100 and unlocked so that the scrap wire discharge mechanism 180 may be actuated. The wire scrap is discharged by lifting the lever 181 upwardly to bring the cut portions 75 of the wire free ends 53 that are held in the secondary wire comb 125 against a scrap wire discharge rib 183 to free the cut ends of the scrap wire held therein. The wire nest 102 is then rotated (to the position indicated in FIG. 3) and a new set 72' of wires 52 is placed into the two wire combs 124, 125 and displayed in a wire preparation orientation. The slide assembly 109 is thereupon again advanced into the wire preparation opening 113 of the apparatus 100 and the second set of wires 72' is then prepared. When the cable 50 is used in LFH (low force helix) terminal assembly termination, four sets of wires are prepared in serial order and then welded to four different terminal assemblies 68, which are then stacked together and assembled into a connector 54 as illustrated in FIG. 8.

The present invention significantly reduces the time required for bulk wire cable preparation and prepares the wire free ends 53 in a more uniform and a quicker manner than is obtainable by the prior art methods involving manual labor, and at a much lower cost. Additionally, the twisting of the wires 52 in the controlled manner by the apparatus' twister members 151, 152 makes the stranded inner cores 58 more robust, which minimizes wire strand dispersion and increases the strength of the welded wire joints to the terminal assemblies.

While the preferred embodiment of the invention have been shown and described, it will be apparent to those skilled in the art that changes and modifications may be made therein without departing from the spirit of the invention, the scope of which is defined by the appended claims.

We claim:

1. A wire preparation apparatus for preparing the ends of cables for attachment to a terminal assembly for an electrical connector, the cables having a plurality of wires extending through said cables, each of the wires having an inner, stranded conductive core formed from multiple wire strands, the inner core being surrounded by an outer insulative covering, the apparatus comprising:

an apparatus base with a wire preparation opening defined therein;

a wire nest for segregating said cable wires into distinct wire sets and for displaying each distinct set of said cable wires in a wire preparation plane, said distinct wire sets being spaced apart from each other and said wires of each distinct set being spaced apart from each other in said wire preparation plane, such that free ends of said wires of each distinct wire set project a preselected distance from said wire nest, the wire nest being moveable into and out of said apparatus wire preparation opening;

a wire stripper for engaging the insulative covering of said wires of each distinct wire set and for removing a preselected portion thereof to expose the conductive inner cores of said wire free ends of each said distinct wire set;

a wire twister for engaging said wire free ends of each said distinct wire set and applying a rotational force thereto in order to twist said individual wire strands of said wire free ends together; and, a wire trimmer for trimming the exposed, twisted wire strands of said wire free ends of each of said distinct wire sets to a predetermined length, said wire stripper, wire twister and wire trimmer all being disposed within said wire preparation opening of said apparatus.

2. The wire preparation machine as defined in claim 1, wherein said wire stripper includes a pair of elongated wire stripper members that are selectively brought into contact with said wire insulative covering from opposite sides of said wire preparation plane.

3. The wire preparation apparatus as defined in claim 1, wherein said wire twister includes a pair of elongated wire engagement members that are selectively brought into contact with said exposed inner cores, the wire engagement members being moveable in a plane that intersects with said wire preparation plane.

4. The wire preparation apparatus as defined in claim 3, wherein said wire engagement members are disposed on opposite sides of said wires and are operatively linked together such that movement of one of said wire engagement members in one direction imparts a like, but opposite movement to the other of said wire engagement member.

5. The wire preparation apparatus as defined in claim 4, wherein each of said wire engagement members includes a surface for contacting said wire free ends from opposing sides of said wires.

6. The wire preparation apparatus as defined in claim 3, wherein said wire engagement members each include a wire contact face, the contact faces having a gripping surface that contacts said wires when said wire engagement members are brought into contact with said wires.

7. The wire preparation apparatus as defined in claim 1, further including a transfer assembly for supporting said wire nest in a preselected orientation and for moving said wire nest along a longitudinal axis of said apparatus to and from said wire preparation opening.

8. The wire preparation apparatus as defined in claim 7, further including a scrap wire ejector for retaining in said wire preparation plane, scrap wires that are cut from said wire free ends, and subsequently ejecting the scrap wires after they have been withdrawn from said wire preparation opening.

9. The wire preparation apparatus as defined in claim 8, wherein said scrap wire ejector includes a wire free end support arm extending out from said transfer assembly, the wire free end support arm being selectively moveable between first and second operative positions, said wire free end support arm including a wire gripping comb extending transversely to said wire preparation plane and wherein is said first operative position, said wire gripping comb contacts and maintains said wire free ends in said wire preparation plane and wherein in said second operative position, said wire gripping comb is brought out of said wire preparation plane and into contact with an ejection member.

10. The wire preparation apparatus as defined in claim 1, wherein said wire trimmer includes a knife member disposed adjacent said wire stripper.

11. The wire preparation apparatus as defined in claim 1, further including a pair of wire combs for gripping said wires and maintaining them in said wire preparation plane during preparation of said wires, the wire combs being disposed on opposite sides of said wire stripper and gripping said wires extending out from said wire nest to maintain said wires in said wire preparation plane.

12. The wire preparation apparatus as defined in claim 11, wherein said two wire combs include primary and secondary wire combs, said primary wire comb being disposed generally adjacent said wire nest and said secondary wire comb being spaced apart from and aligned with said wire nest and said primary wire comb.

13. The wire preparation apparatus as defined in claim 12, wherein said secondary wire comb is moveable into and out of alignment with said primary wire comb.

14. A wire preparation apparatus for preparing free ends of multi-conductor cable wires for subsequent attachment to a terminal assembly, each of the cable wires having a multi-strand inner conductive core surrounded by an outer insulation, the apparatus comprising: means for displaying a set of cable wires in a preparation position, means for advancing said cable wire set to a preparation location, a wire stripper disposed in said preparation location, the wire stripper including opposing wire stripper members that selectively engage said outer insulation of said cable wire set to expose a portion of said inner cores of said cable wire set, a wire twister disposed in said preparation location proximate to said wire stripper, the wire twister including two elongated wire twister members that extend transversely to said cable wire set, means for moving said wire twister members into engagement with said cable wire set and means for moving said wire twister members in respective opposite directions to thereby impart a twist to said wire set exposed inner cores, said two wire twister members being operatively interconnected by a linkage such that movement of one of said two wire twister members in one direction imparts an opposite movement in the other of said two wire twister members, and a wire cutter disposed in said wire preparation location and proximate to said wire stripper, the wire cutter including a cutting blade moveable into and out of contact with said cable wire set for cutting said cable wires.

15. The apparatus of claim 14, wherein said wire twister members engage said cable wire set outer insulation.

16. The apparatus of claim 14, wherein said cable wire display means includes a wire nest, the wire nest having at least two oposing wire clamp members that display said cable wire set in a common horizontal plane.

17. The apparatus of claim 16, wherein said wire twister members move in directions transverse to said cable wire set common horizontal plane.

18. The apparatus of claim 17, wherein said wire stripper and said cutting blade extend transversely to said cable wire set common horizontal plane and said cutting blade is interposed between said wire stripper and said wire twister.

19. The apparatus of claim 14, wherein said cable wire set display means includes a wire nest for separately displaying distinct cable wire sets and said cable wire set advancing means includes a wire nest cradle selectively moveable to and away from said wire preparation location, the wire nest cradle holding said wire nest so that one cable wire set extends outwardly therefrom, said wire nest cradle further including a pair of wire combs for gripping said cable wire set, the two wire combs being spaced apart from each other along a longitudinal axis of said apparatus such that when said cable wire set is advanced to said wire preparation location said two wire combs lie on opposite sides of said wire stripper, wire twister and wire cutter.

20. The apparatus of claim 19, further including means for ejecting a portion of said cable wire set from one of said wire combs.

21. The apparatus of claim 14, wherein said wire stripper includes two wire stripper members that engage said cable wire set from opposite sides, said cutting knife being disposed adjacent one of said two wire stripper members and the other of said two wire stripper members having a planar surface disposed thereon in opposition to said cutting knife to define a reaction surface against which said cutting knife cuts said cable wire sets.

22. An apparatus for preparing multi-conductor cables for termination, the cable including a plurality of individual wires, each wire having an inner core of multiple conductive wire strands and an outer insulation covering the inner core, the apparatus preparing, in serial order, distinct sets of said wires by stripping said outer insulation, twisting said multi-strands together to form more robust inner cores and cutting said wires strands to provide each of said wires with an exposed twisted wire strand lead, said apparatus comprising:

a frame supporting a wire preparation work station;

means for holding said cable wires in distinct wire sets, each wire set including a predetermined number of wires in spaced-apart order, all of said wires of said wire set lying on a common plane;

means for advancing said wire set into and out of said wire preparation work station, said wire set advancing means including means for retaining said wire set holding means in place thereon so that one of said wire set common planes occupies a horizontal plane and said one wire set includes a plurality of wire free ends that extend forwardly of said wire set holding means;

a pair of wire stripper members disposed at said wire preparation work station that engage said outer insulation of said wire set to strip said outer insulation a preselected distance therefrom to expose a preselected length of said inner wire strands;

a pair of elongated wire twisting members disposed at said wire preparation work station that engage said wire set from opposite sides thereof, the wire twisting members being capable of lateral movement in directions transverse to said one wire set horizontal common plane, said wire twisting members further being linked together such that movement of one wire twisting member imparts an opposite movement in the other wire twisting member; and, a wire cutter for cutting said wire set along a path across said exposed inner strands that is transverse to said wire set horizontal plane.

23. A method of preparing a plurality of wires for attachment to a terminal assembly by preparing free ends of the wires, each of said wires having an outer insulative covering and an inner conductive core composed of multiple wire strands, the method comprising the steps of:

arranging said wires into distinct wire sets with each wire set containing a preselected number of wires;

providing a wire preparation station and advancing a first wire set of said wire sets to said wire preparation station;

engaging said wires of said first wire set from opposite sides with two opposing wire stripper members and drawing said first set of wires backwards to strip said outer insulation covering of said first wire set for a predetermined length to expose said wire strand inner cores of said wires;

engaging said wire first set from opposite sides with two opposing elongated wire twister members and laterally moving said wire twister members in opposite directions to rotate said wires of said first wire set and twist said wire strands together;

cutting said exposed wire strands of said first wire set to produce an exposed, twisted multi-strand lead on each of said wires of said first wire set, and, repeating said advancing, stripping, twisting and cutting steps until all of said wire sets have been prepared.

24. A wire preparation apparatus for preparing free ends of multi-conductor cable wires for subsequent attachment to a terminal assembly, each of the cable wires having a multi-strand inner conductive core surrounded by an outer insulation, the apparatus comprising: a wire nest for displaying a set of cable wires in a preparation position, the wire nest having two opposing wire clamp members that display said cable wire set in a common horizontal plane, means for advancing said cable wire set to a preparation location, a wire stripper disposed in said preparation location, the wire stripper including opposing wire stripper members that selectively engage said outer insulation of said cable wire set to expose a portion of said inner cores of said cable wire set, a wire twister disposed in said preparation location proximate to said wire stripper, the wire twister including two elongated wire twister members that extend transversely to said cable wire set, means for moving said wire twister members into engagement with said cable wire set and means for moving said wire twister members in respective opposite directions to thereby impart a twist to said wire set exposed inner cores, and a wire cutter disposed in said wire preparation location and proximate to said wire stripper, the wire cutter including a cutting blade moveable into and out of contact with said cable wire set for cutting said cable wires.

* * * * *